(12) United States Patent
Fogerlie

(10) Patent No.: US 8,235,544 B2
(45) Date of Patent: Aug. 7, 2012

(54) SOLAR LIGHT ASSEMBLY FOR STREET AND PARK LIGHTING

(76) Inventor: Sivert G. Fogerlie, Glendale, AZ (US)

( * ) Notice: Subject to any disclaimer, the term of this patent is extended or adjusted under 35 U.S.C. 154(b) by 74 days.

(21) Appl. No.: 12/824,151

(22) Filed: Jun. 26, 2010

(65) Prior Publication Data
US 2010/0328931 A1  Dec. 30, 2010

Related U.S. Application Data

(60) Provisional application No. 61/269,679, filed on Jun. 29, 2009.

(51) Int. Cl.
*F21V 33/00* (2006.01)

(52) U.S. Cl. ........ 362/183; 362/365; 362/366; 362/418; 362/417

(58) Field of Classification Search .................. 362/183, 362/365, 418, 419, 285, 287
See application file for complete search history.

(56) References Cited

U.S. PATENT DOCUMENTS

| | | | |
|---|---|---|---|
| 2,572,825 A | 10/1951 | Guth | |
| 2,922,030 A | 1/1960 | Bobrick | |
| 4,232,361 A | 11/1980 | Kelsall | |
| 4,835,664 A * | 5/1989 | Wen | 362/183 |
| 4,887,196 A | 12/1989 | Brown et al. | |
| 6,004,002 A * | 12/1999 | Giannone | 362/183 |
| 6,402,352 B1 | 6/2002 | Summerford et al. | |
| 6,893,139 B2 | 5/2005 | Cercone et al. | |
| 6,951,408 B2 * | 10/2005 | Stewart | 362/183 |
| 7,093,959 B2 | 8/2006 | Tsao | |
| 7,298,969 B2 | 11/2007 | Elberbaum | |
| 7,645,047 B2 * | 1/2010 | Martinez | 362/20 |

* cited by examiner

*Primary Examiner* — Anabel Ton
(74) *Attorney, Agent, or Firm* — Scott A. Hill; The Hill Law Firm, PLC

(57) ABSTRACT

The present solar light assembly uses a unique housing having a light that can be adjustably rotated and tilted for park and street lighting applications. Once assembled, the housing is covered by a solar panel that charges a remotely located battery and acts as a protective lid over the housing. Rather than removing the solar panel to access the contents of the housing, the housing can be accessed by excessively tilting the light until a shroud swings away from an opening in the housing designed to accommodate the light. The shroud, which can retract into the housing, protects the contents of the housing from inclement weather and from view. When the light is excessively tilted, the shroud swings away from the housing to expose wires, electronics and other contents of the housing that may require servicing. Because a solar light system is pole mounted at least several meters above ground level, being able to easily access the housing from below without needing to remove any heavy or awkward parts provides a much safer alternative than other solar light systems.

16 Claims, 6 Drawing Sheets

SOLAR LIGHT ASSEMBLY FOR STREET AND PARK LIGHTING

RELATED U.S. APPLICATION DATA

This application claims the benefit of priority of U.S. Provisional Application No. 61/269,679, filed on Jun. 29, 2009, and titled "Solar Light Assembly for Street and Park Lighting", incorporated herein by reference in its entirety.

BACKGROUND OF THE INVENTION

Solar panels are frequently used to recharge batteries during the day that then subsequently are able to power lights at night. Solar panels may serve multiple functions, and, although it is very common for a solar panel to be positioned away from a light source, some outdoor light assemblies use a solar panel as a cover to a container that contains electronics and other components that need to be protected against water exposure and inclement weather. Solar light assemblies may be positioned at variable heights from the ground, with variable difficulty and safety issues associated. It is safe and easy to service solar light systems that are close to the ground, such as walkway and construction lights. For larger outdoor light assemblies, such as those that can provide street or park lighting, the light is frequently mounted several meters above the ground on a pole, such as those shown in U.S. Pat. Nos. 6,060,658, 5,149,188, 4,281,369 and 4,200,904. It is not a simple task to remove a solar panel mounted high above the ground for the purpose of accessing electronics when servicing is required. In order to make a light assembly more versatile, it is advantageous to be able to adjust the direction of a light rather than always having a light that shines straight down.

SUMMARY OF THE INVENTION

The present invention is a solar powered light system that is a suitable alternative to conventional pole mounted street or park lighting, especially for areas that are not already supplied with power. A light having a shroud is hingedly attached to a housing. The shroud allows the light to be tilted such that it can provide vertical illumination of the ground, and by tilting the light, horizontal illumination. There are numerous tilt positions in between these two extremes to provide a broad range of illumination. By excessively tilting the light beyond 90 degrees, the shroud swings away from the housing to expose the contents of the housing. With this easy access to the inside of the housing, there is no longer a need to remove the solar panel that covers the housing. Although a light assembly can be flat mounted to disguise the presence of a solar panel, the solar panel may be mounted at an angle such that the light of the sun is more efficiently converted into power. An additional benefit of the present invention is that the solar panel itself may be used as a protective cover, or lid, for the housing of the solar light assembly which contains the weather-sensitive components.

Figure 1:
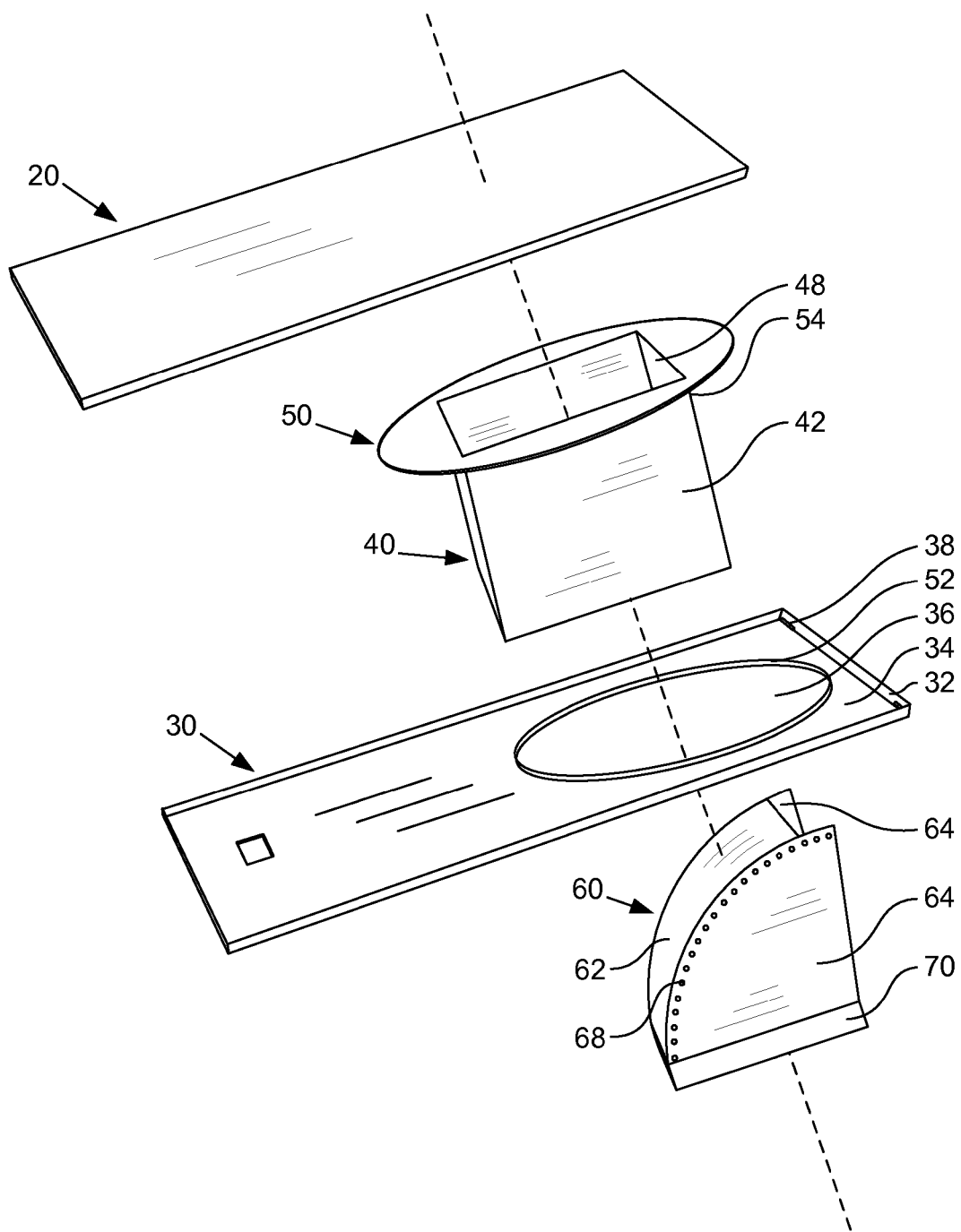
FIG. 1 is an exploded perspective view of a solar light assembly of the present invention.

The following is the list of numerical callouts used in FIGS. 1-11:

12 solar light assembly
20 solar panel
22 junction box
30 frame
32 edges
34 tray portion
36 hole
38 drainage passageway
40 housing
42 sides
44 face
46 aperture
48 cavity
49 lip
50 disc
52 rain barrier ridge
53 gap
54 guide
56 opening
58 tab
60 shroud
62 arcuate portion
64 triangular sides
66 hinge
68 adjustment holes
70 light
72 charge controller
74 holder
80 pole

DETAILED DESCRIPTION OF THE INVENTION

The focus of the present invention is on combining a tilt feature of a solar light system with easy access to electrical components that may need to be serviced or replaced. An additional benefit is combining the above features with the ability to rotate a tilted light 360 degrees, thereby giving a very broad illumination range. The preferred embodiment is shown in FIGS. 1-7. This detailed description will describe the solar light assembly substantially from the top down, as assembled, and then describe the alternate embodiments shown in FIGS. 8-11. Throughout the remainder of this description, the term "top" refers to that surface or portion of a part or feature that is relatively closest to the top of FIG. 1 or 8. Generally, a solar light assembly 12 uses a solar panel 20 that is supported by a frame 30 to cover a housing 40 that houses components of the system. A disc 50 that is either part of the housing, or that rotates against the housing, provides the rotational adjustment of the light 70. The light is hingedly attached such that it can be tilted away from a face 44 of the housing. By excessively tilting the light, a shroud 60 attached to the light will swing away from an aperture 46 to expose components inside the housing, including a back portion of the light itself.

Figure 9:
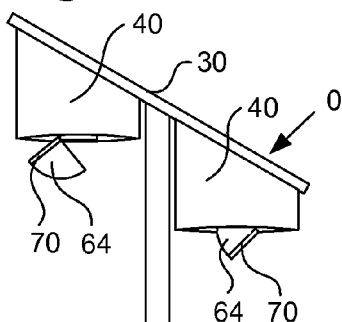
FIG. 9 is a side view of an alternate embodiment of the present invention, showing the full length of the pole.

The above are combined to bring the solar light assembly 12 together into a low maintenance outdoor lighting solution. Wiring, which is usually just low voltage insulated wires that meet local codes, is not shown. The most preferred use of the solar powered light assembly of the present invention is as a street or park light, as shown in FIG. 9, with the pole 80 typically being several meters taller than ground level. Additional or alternate features that make the solar light assembly more versatile or easier to use will be discussed throughout this description. Where reference numbers in one figure are the same as another figure, those reference numbers carry substantially the same meaning. Preferred sizes, materials and methods of attachment will be discussed, but these preferences are not intended to exclude other suitable or functionally equivalent sizes, materials or methods of attachment.

A solar panel 20 that is well suited for use with the solar light assembly 12 of the present invention should be substantially impervious to harsh conditions. The preferred solar panel, shown in FIGS. 1,4,5,8 and 10, is a flat panel that is formed in layers such that an array of solar cells are encased in a durable transparent material, such as a 100 watt or larger standard crystalline solar panel designed for use with 12 volt systems. The solar panel's perimeter is typically protected by a rigid border, which may also be used to support the solar panel. The solar panel's back, opposite the collection surface, has a junction box 22 with electrical leads which carry the potential gathered by the front of the solar panel. These electrical leads are connected to a charge controller 72 that is electrically connected to a rechargeable battery that powers the light 70 of the system. The battery, not shown, is preferably kept in an underground battery container to limit the temperature extremes the battery will experience.

The top of the solar light assembly 12 must be covered to prevent the ingress of rain and snow, so the solar panel 20 also functions as a cover for the assembly. A frame 30 is used to protect and support the solar panel in a desired position. The frame has a large aperture 36 that accepts the housing 40. It is understood that it may be desirable to precisely size the length and width of the frame of a solar light assembly so that it exactly fits a particular solar panel. The frame can be all one material, as shown in FIGS. 1-8, with a structural portion and a tray portion 34 being integrated such that formed sheet metal, thermoformed plastic, or other strong tray-like structure can be used. Alternatively, if a weak or thin material is used to form the tray portion of the frame, the structural portion, such as structural members that are welded or otherwise structured to be load bearing, can be secured to the tray portion. Structural members, if needed, should at least extend between the pole 80 and the housing to help bear the weight of any excess loads, such as snow or wind. The tray portion can be any desired material, such as plastic, sheet metal, metal meshing, or other material that can provide the bottom of the solar panel with good protection against a rock thrown by a vandal. The solar panel is secured to the frame using fasteners, such as tamper-resistant screws that go through edges 32 of the frame and secure to the rigid border of the solar panel.

Figure 10:
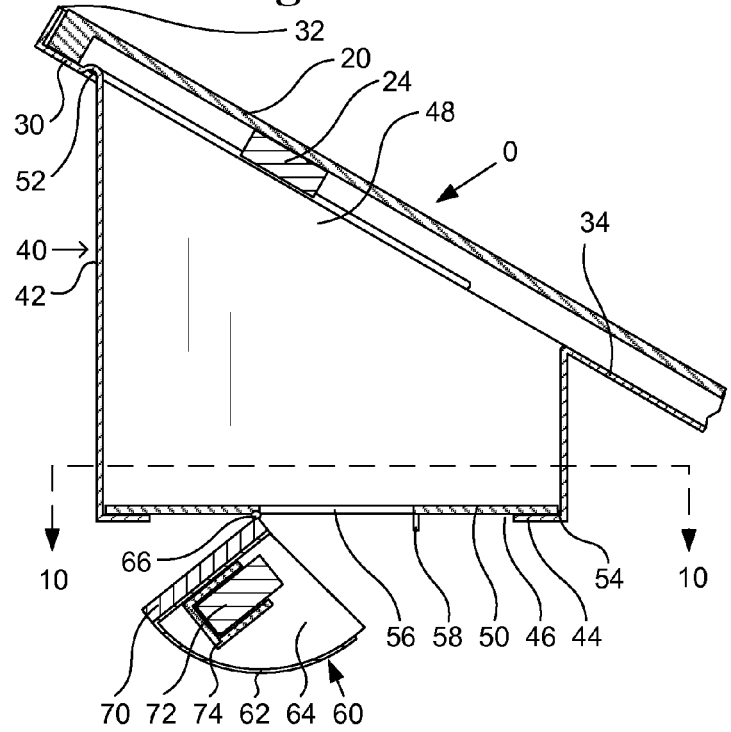
FIG. 10 is a cross section of part of a light assembly that could be used with the assembly in FIG. 9, which uses a solar panel that is angled toward South.

For a flat mounted solar panel, the edges 32 of the frame 30 are preferably high enough to conceal the solar panel 20 from view by someone on the ground, which may reduce the likelihood of vandalism being directed against the solar panel. The edges can be very short, preferably only a few centimeters high. Although edges are not absolutely necessary, they are preferred because they offer added protection to the solar panel while maintaining a uniform appearance for the solar light assembly 12. The tray portion of the frame additionally provides protection for wiring that extends from the battery. This wiring can simply be run through the pole and then routed over the tray portion and down into the housing 40 through the aperture 36 in the frame. When viewed from ground level, the orientation that would normally be seen by someone walking under the solar powered light assembly, the tray portion 34 substantially frames the housing. FIG. 10 shows how the housing and frame may be formed into a single part such that the sides of the housing integrally meet with the bottom of the frame.

Figure 4:
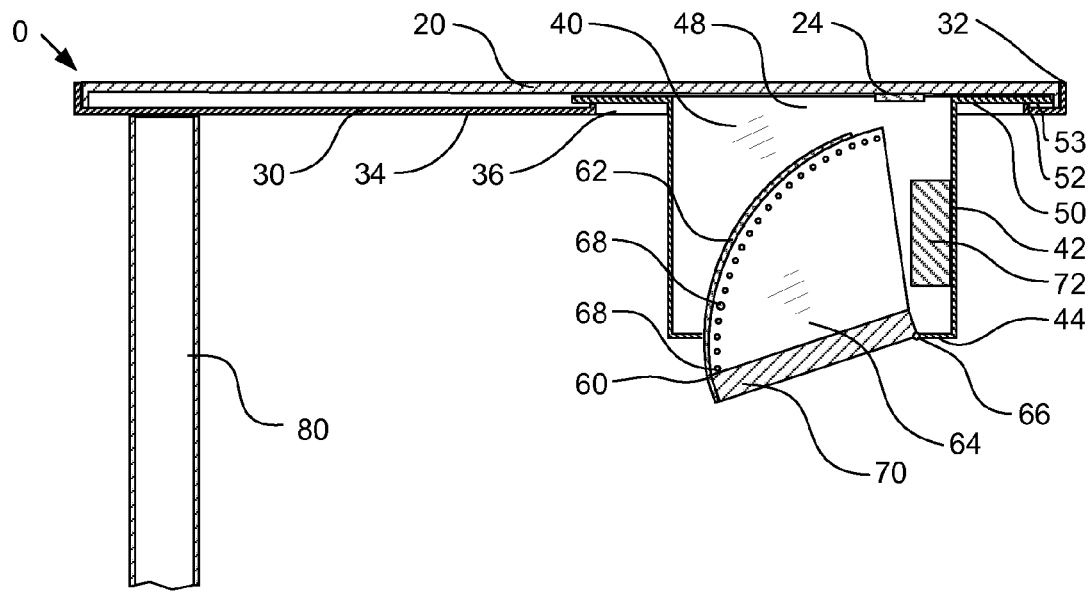
FIG. 4 is a cross section through line 3-3 of FIG. 3.

The tray portion of the frame 30 should have at least one drainage passageway 38, such as a groove cut through the tray portion, to prevent water from collecting in the solar light assembly. Obviously, if the tray portion is a mesh material, then there is no need to provide additional drainage. If drainage might be a problem, a rain barrier ridge 52 should also be provided to divert water away from flowing into the housing 40. The rain barrier ridge can just be an additional structure on the tray that is raised relative to a surface of the tray portion that may collect water. As shown in FIG. 4, the rain barrier ridge can be formed at or adjacent the perimeter of the aperture 36 of the frame such that the disc 50 will be raised relative to the tray portion of the frame. The resulting gap 53 allows water to flow under the disc before being diverted away from the aperture in the frame. Because any water that flows under the gap cannot then flow into the housing, the rain barrier could also include drainage passageways, but this may cause unwanted mineral buildup on the outside of the housing.

Figure 2:
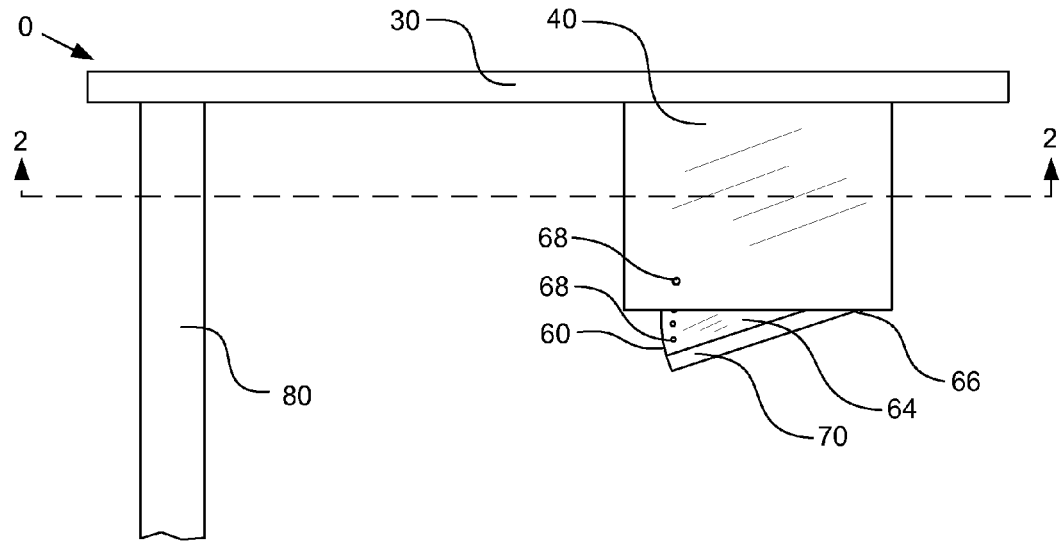
FIG. 2 is a side view of the solar powered light assembly of FIG. 1, including part of the pole.
Figure 3:
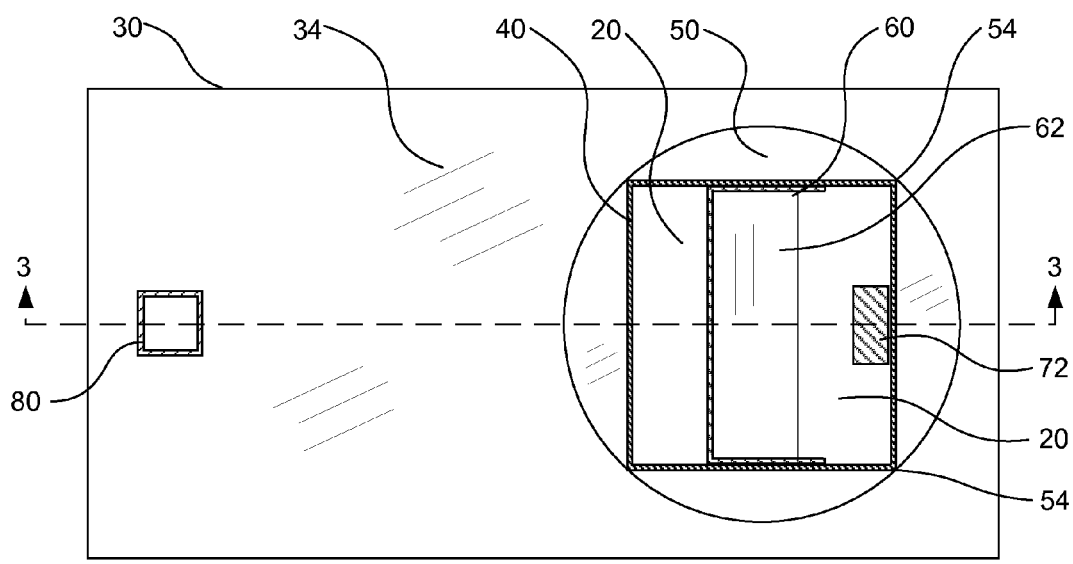
FIG. 3 is a cross section, looking up, through line 2-2 of FIG. 2.
Figure 7:
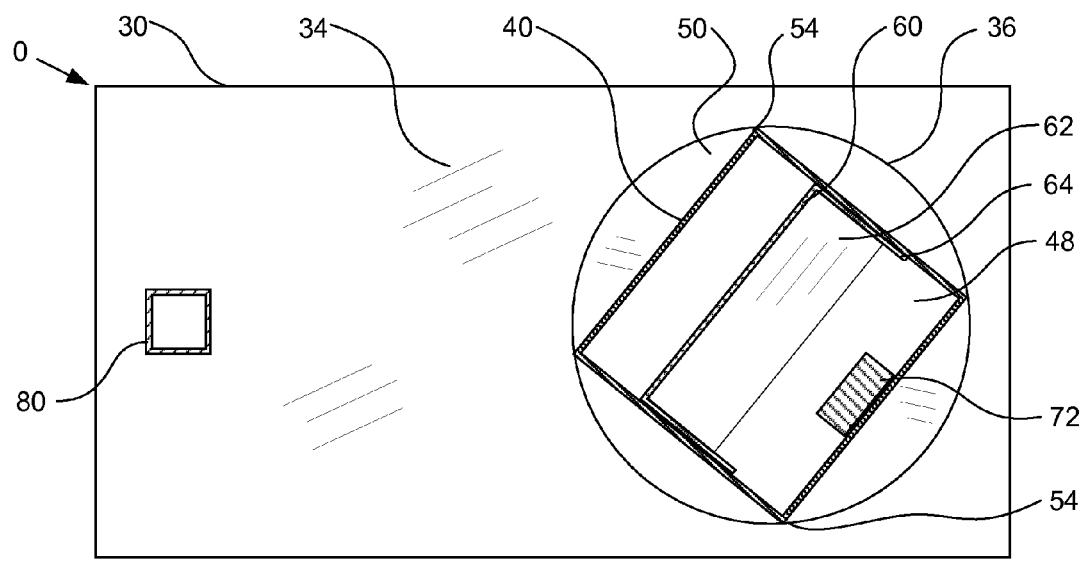
FIG. 7 is a cross section through line 6-6 of FIG. 6.

The housing 40 is made from a durable and rigid material that may be stamped, injection molded, or otherwise formed. Suitable materials include plastic, aluminum, steel, polyester, fiberglass, nylon, vinyl, carbon fiber materials, polycarbonate, or other composite materials that are substantially impervious to fracturing. There must be enough rigidity in the material so that an installed housing maintains its shape even when being rotated to a desired position. The most preferred method of making the housing is by thermoforming it from a single sheet of ABS plastic or polycarbonate. The thickness of the sheet will usually be between about five and ten millimeters, but will depend upon the material that is used and the overall size of the housing. Although the housing can be virtually any desired shape, the most preferred shape, shown in FIGS. 1-7, has rectangular ends that are separated by sides 42. One of the ends has a face 44 that substantially frames the aperture 46, which is a cutout for the light 70. Because it will be covered by the solar panel, a cavity 48 at a top portion of the housing is left open so the housing can easily be thermoformed. The length of the longest diagonal of one of the ends of the housing defines the minimum diameter of the aperture 36 of the frame 30 such that the housing can be installed through the aperture, noting that the ends of the housing do not need to be the same size or shape. With the housing installed in the aperture, the corners defined by the sides of the housing act to center the housing about the aperture, as shown in FIG. 3. The open end of the housing can freely rotate in a plane substantially parallel to the plane of the tray portion of the frame, as shown in FIG. 7. If the clearance between the corners of the housing and the aperture are tightened, the housing will be more difficult to rotate, which may be desirable if there is any concern that the weight of the housing will not adequately prevent the housing from rotating by the force of a wind.

A disc 50 extends outwardly from the open end of the housing 40, as shown in FIGS. 1-7. Preferably, the disc and housing are thermoformed as a single part. The diameter of the disc is greater than the diameter of the aperture 36, preferably by at least one centimeter, more if a gap 53 for water is desired. The disc, which substantially rests against the frame 30, prevents the housing from slipping through the aperture and otherwise supports the housing while masking the excess of the aperture not filled by the housing, as shown in FIGS. 3 and 7. The weight of the housing should provide adequate frictional force against the frame to securely hold the housing in a desired position, but a fastener can be used to fix the disc relative to the frame. Where there is a rain barrier ridge 52 adjacent the aperture, the disc is rotatable against the rain barrier ridge itself. Alternatively, the rain barrier ridge could be built into the disc by inverting the rain barrier ridge such that it would be rotatatable against the tray portion of the frame, but this could raise the earlier concern regarding mineral buildup forming on the outside of the housing if too much water leaks under the rain barrier ridge.

Figure 5:
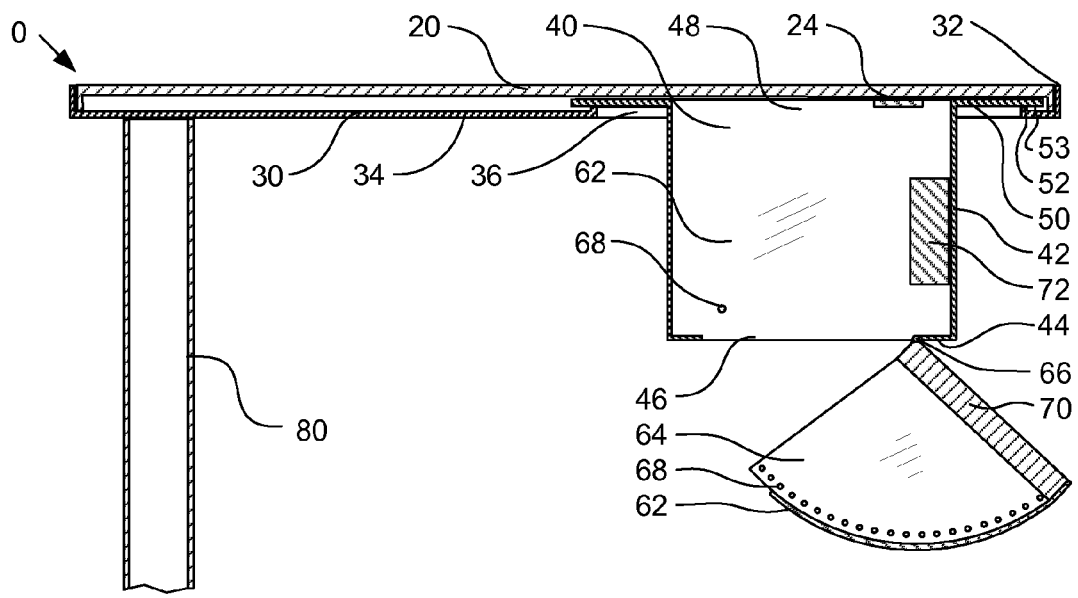
FIG. 5 is a cross section view similar to FIG. 4, but showing the light and shroud tilted to expose the contents of the housing.
Figure 6:
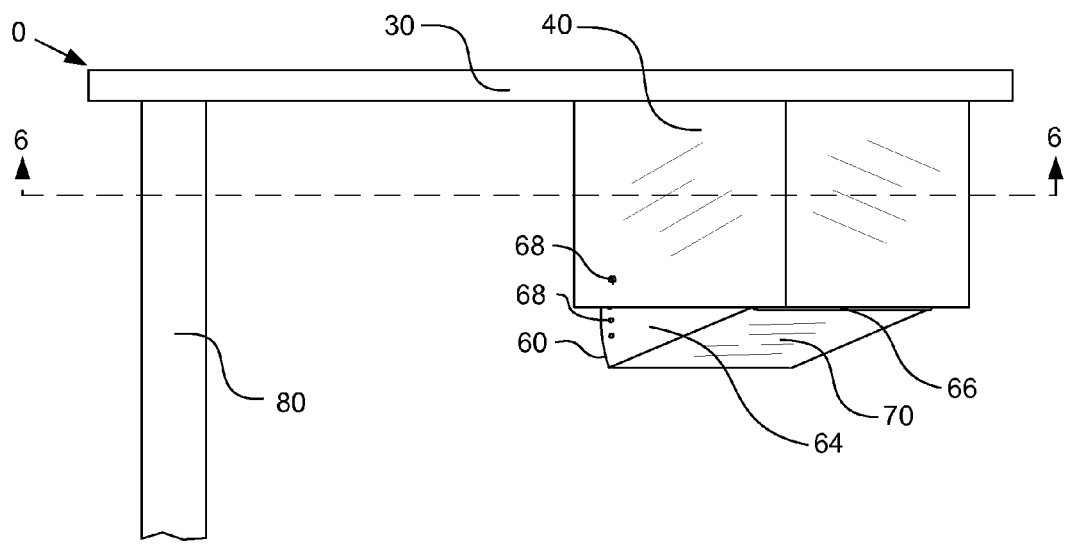
FIG. 6 is a side view similar to FIG. 2, but showing the housing rotated such that the light will be cast in a different direction.

A shroud 60 is housed within the housing 40 when the illumination cast by the light 70 is vertical, herein defined to be zero degrees of tilt. When the light is tilted away from the face 44 of the housing, the shroud similarly swings out of the housing to conceal the aperture 46 that would otherwise be exposed in the absence of the shroud. The shroud has an arcuate portion 62 that is substantially a uniform distance from a hinge 66. The shroud also has triangular sides 64 at opposing ends that cover the area between the arcuate portion and the hinge. The triangular sides are adjacent opposing sides of the housing, preferably abutting the sides 42 of the housing. A formed seal or weather stripping can be used between the housing and the shroud to prevent insects from entering the housing. The aperture of the housing is covered by the light and the shroud at any angle between about zero degrees of tilt and about ninety degrees of tilt, ninety degrees being where the illumination cast by the light is horizontal. The degrees of tilt can be fixed in a desired position by fasteners that pass through the housing and secure to the triangular sides, as shown in FIG. 2. Optionally, a tab projecting from the face of the housing could be provided such that a fastener can secure to the arcuate portion of the shroud. Numerous pre-drilled holes can offer quick and easy adjustment of the tilt. FIG. 4 most clearly shows how the triangular sides can project farther into the housing than the arcuate portion to provide a means for fastening the shroud to the housing at or near ninety degrees of tilt. The arcuate portion of the shroud only covers about the first ninety degrees of tilt. Beyond ninety degrees of tilt, the light will illuminate the sky, which is typically not desirable for a street or park light. As the light is increasingly tilted beyond ninety degrees, the aperture of the housing becomes increasingly exposed as the arcuate portion swings away from the aperture. With the shroud tilted away from the aperture, as shown in FIG. 5, electronics inside the housing can be accessed and serviced from someone positioned under the solar light assembly, thereby avoiding the need to remove the solar panel 20 that covers the solar light assembly 12.

The light 70 is preferably an array of bright white light emitting diodes (LEDs) that are sealed into a weatherproof acrylic brick, but other suitable or alternative light sources can be substituted. A 120 LED brick light is well suited for the solar light assembly 12 because it provides a uniform dispersion of light that is adequate for most uses. The light is mounted near or to the face 44 of the housing 40 using at least one hinge means 66. The light is also fixed to the shroud 60 using fasteners or adhesive. When the light is tilted well beyond ninety degrees, the back of the light is accessible. If desired, the charge controller or other electronics can be mounted to the back of the light, such as with fasteners or adhesive. Alternatively, an appropriately sized holder 74 can be fixed to one of the sides 42 of the housing 40, or even fixed to the back of the light, which will provide easier access to electronics that can simply be slipped out of their holder to be tested or replaced. Wiring can just hang loosely within the housing because once the rotation and tilt of a light are fixed, there should not be any reason the wiring will undergo additional movement.

In conjunction with using an energy efficient light, an energy-conserving switch, not shown, can be used with the solar powered light assembly. Examples of energy-conserving switches include motion sensors, dusk-to-dawn photoelectric sensors, timers, remote controls, and combinations of the switches just mentioned. Probably the most popular and useful of the switches are motion sensors that have a timer. Motion sensors need to be capable of "seeing" the surroundings, so the sensor is preferably mounted in or adjacent the light. Adding a recessed sensor aperture into an acrylic brick light would be ideal. The sensor can be adjusted for a desired sensitivity and coverage area by accessing the back of the light when it is tilted well beyond ninety degrees. The sensor is typically electrically connected between the light source and a rechargeable battery.

A rechargeable battery is the power supply for the light. Most solar panels that could be used with the solar light assembly are designed for 12 volt systems, so a 12 volt battery should be used. A 100 Amp hour or larger sealed maintenance-free lead-acid battery would be suitable for dusk to dawn applications. Because such a large battery is used with a system of the present invention, it is only recommended to locate the battery remotely rather than attempting to install the battery into the housing. A charge controller 46 should be electrically connected between the rechargeable battery and the solar panel. A charge controller with a built in low voltage disconnect device will protect the battery from excessive charge or discharge. Morningstar Corporation, Washington Crossing, Pa., offers simple 12 volt charge controllers, such as their SunLight™ models, which are ideally suited for solar light assembly applications. As already discussed, the charge controller can be housed inside the housing so it can be easily accessed for service or replacement.

The pole used to mount the solar light assembly several meters above ground level can be any common pole, such as four inch rectangular steel tubing. Any known method for erecting a pole and running wiring up the pole can be implemented. Brackets and/or other mounting hardware, not shown, may be required to properly secure the frame to the pole.

Figure 8:
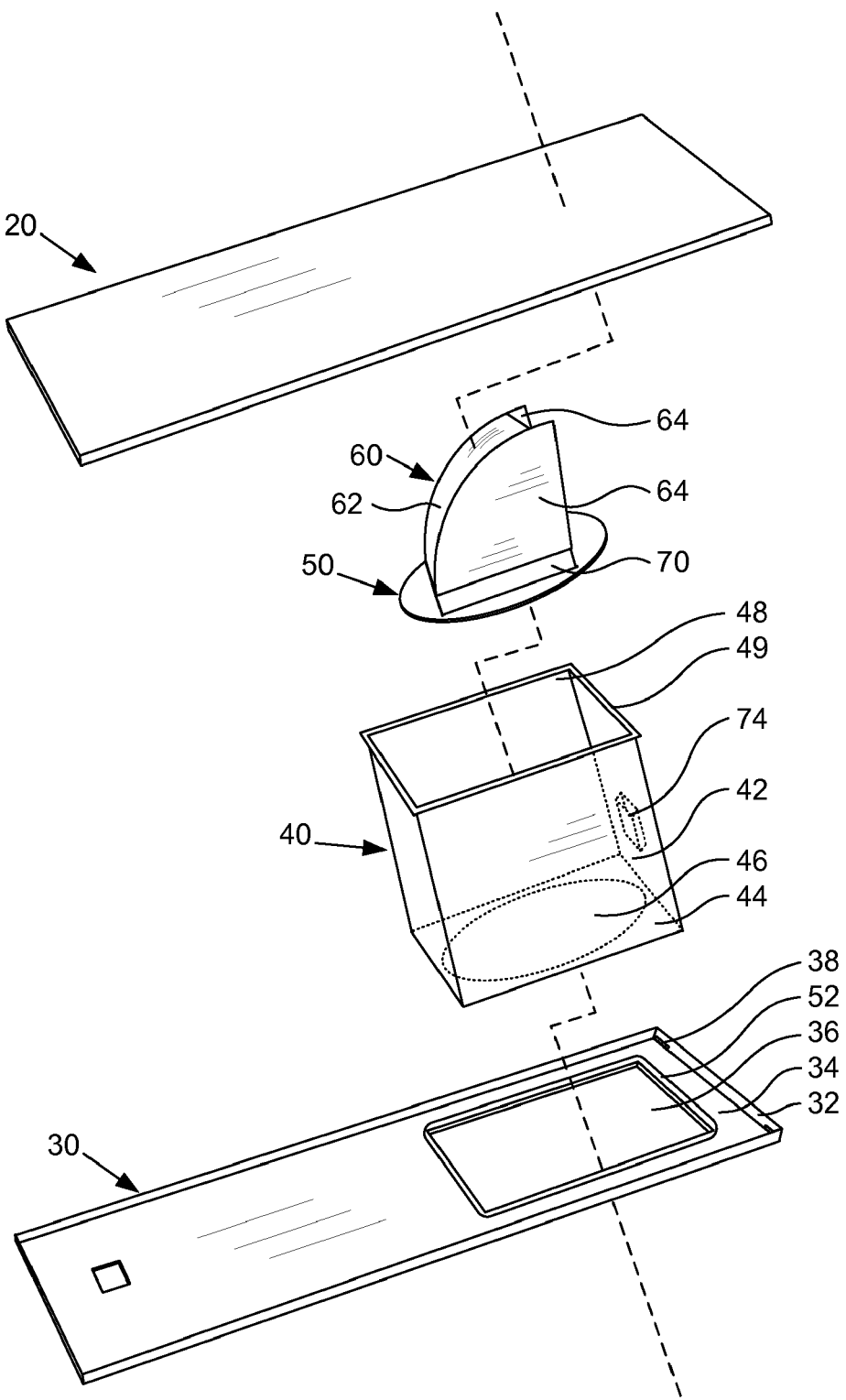
FIG. 8 is an exploded perspective view of an alternate embodiment of a solar light assembly with the disc being rotatable against the housing rather than against the tray.
Figure 11:
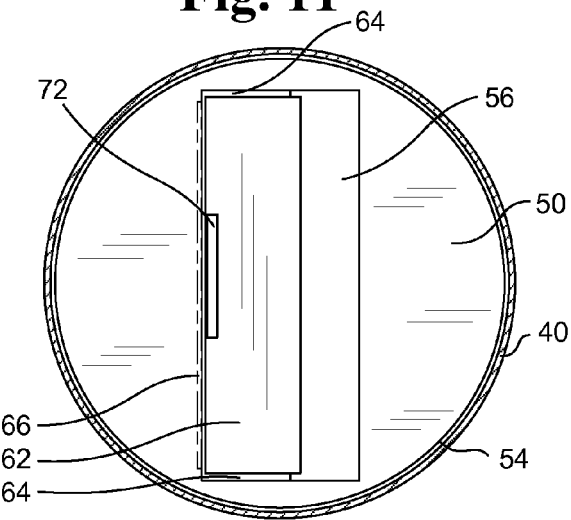
FIG. 11 is a cross section through line 10-10 of FIG. 10.

FIGS. 8-11 show alternate preferred embodiments that are similar to the solar light assembly of FIGS. 1-7, except that the rotational adjustment is located at the bottom of the housing rather than at the top of the housing. The housing 40 in FIG. 8 has a lip 48 that supports the housing against the aperture 36 of the frame 30. The frame can otherwise have all of the additional features already described above. The housing can be rectangular, as shown in FIG. 8; cylindrical, as shown in FIGS. 9-11; or any other desired shape. The aesthetic benefit of the alternate preferred embodiment of FIG. 8 is that a rectangular housing will remain aligned with a rectangular frame, even if the light is rotated. The drawback is that the housing will be larger relative to the size of the light because the disc 50 is inside the housing. In the various alternate preferred embodiments, the disc rests adjacent the aperture 46 of the housing such that the disc is supported by the face 44 of the housing. The light 70 is hingedly attached to the disc itself, inside a opening 56 that passes through the disc. The shroud 60 is positionable within the opening in substantially the same way the shroud was positionable within the aperture in FIGS. 1-7, already described. Rather than having the pre-formed adjustment holes 68 previously shown, FIGS. 8-12 show how a tab 59 that protrudes from the disc is fastened, such as with a self-tapping screw, to the arcuate portion of the shroud so the light will maintain a desired tilt. Alternatively, the disc could be similarly fastened to the triangular portions of the shroud.

In FIG. 8, the charge controller is held adjacent a side 42 of the housing 40 using a holder 74. Because the disc 50 is rotatable relative to the housing, the line of sight for someone servicing a charge controller will not always favor viewing the side of the housing on which the charge controller and holder are located. To correct this orientation problem, the disc can simply be rotated until the hinge of the light is closest to the holder, thereby making the holder easily visible and accessible.

In FIGS. 9-11, there are two housings 40, both being cylindrical, and both being mounted to the same frame 30. The frame is designed to support a solar panel 20 that is partially facing south for a more efficient system. A center mounted pole 80 more evenly distributes the weight of the solar light assembly. The sides 42 of the housing are adjusted to accommodate the tilted solar panel and frame. The frame and both housings have been thermoformed as a single piece part, even including the rain barrier ridge 52. The light is wider than in the preferred embodiment so a tilted light won't swing very far away from the face 44 of the housing. The resulting cavity 58 leaves less room for servicing electronics housed within the housing, so the holder 74 for the charge controller 72 has been mounted to the back of the light 70, as shown in FIGS. 10 and 11.

While a preferred form of the invention has been shown and described, it will be realized that alterations and modifications may be made thereto without departing from the scope of the following claims.

What is claimed is:

1. An outdoor solar light system comprising:
    a housing having sides and a face, the face having an aperture;
    a light that is tiltably mounted at least partially in or adjacent the aperture;
    a disc that is fixed to and extends outwardly from a top portion of the housing such that the housing suspends from the disc;
    a solar panel that at least covers the top portion of the housing; and
    a frame that frames the solar panel and supports the disc such that the disc and housing can be rotated relative to the solar panel by manually manipulating the housing such that the disc and housing rotate relative to the frame and solar panel.

2. The system of claim 1 wherein the disc and the housing are molded or formed of the same material.

3. The system of claim 2 wherein the frame is at least partially characterized by a tray portion that prevents blowing rain and dirt from hitting the underside of the solar panel, and wherein the tray portion is characterized by a hole having a smaller diameter than the disc but a large enough diameter to accept the housing such that the disc can be manually rotated adjacent the hole.

4. The system of claim 3 further comprising a rain barrier ridge substantially adjacent and surrounding the hole of the tray portion such that water that collects on the tray portion is prevented from flowing through the hole.

5. The system of claim 4 wherein the disc is characterized by a larger diameter than the rain barrier ridge, and wherein the disc rests against the rain barrier ridge, such that there is a substantially uniform gap between the disc and the tray portion.

6. The system of claim 1 further comprising a shroud, characterized by two sides separated by an arcuate portion, that at least partially surrounds the light, and wherein the arcuate portion terminates such that the aperture is at least partially exposed when the light is excessively tilted away from the face of the housing.

7. The system of claim 6 wherein the two sides of the shroud extend farther into the housing than the arcuate portion.

8. The system of claim 6 further comprising fasteners for fastening the two sides of the shroud against two opposing sides of the housing.

9. The system of claim 6 wherein the two sides of the shroud are substantially triangular and characterized by an obtuse angle near where the light is tiltably mounted.

10. The system of claim 6 further characterized by a holder means for holding a device inside of the housing.

11. The system of claim 6 wherein the device is a charge controller that is electrically connected between the solar panel and a rechargeable battery.

12. An outdoor solar light system comprising:
    a frame that frames a solar panel, the frame characterized by a hole that is covered by the solar panel relative to the sun;
    a housing, that is fixed to the frame substantially adjacent the hole, the housing having sides and a face, the face being characterized by an aperture;
    a disc positioned inside the housing such that it can be manually rotated against the face, the disc characterized by an opening;
    a light that is tiltably mounted to the disc, in or adjacent the opening; and
    wherein the position of the light may be manually manipulated by rotating the disc relative to the housing, or by tilting the light relative to the disc.

13. The system of claim 12 wherein the frame and the housing are integrated such that a rain barrier ridge is formed substantially around the hole by forming a raised portion where the frame and housing meet, and wherein the frame is characterized by at least one drainage passageway that allows accumulating water to drain off of the frame.

14. The system of claim 13 further comprising a second housing that is integrated with the frame.

15. The system of claim 12 further comprising a shroud, characterized by two sides separated by an arcuate portion, that at least partially surrounds the light, and wherein the arcuate portion terminates such that the aperture is at least partially exposed when the light is excessively tilted away from the face of the housing.

16. The system of claim 15 further comprising a tab that is fixed to and depends from the disc for fastening the shroud to the disc using a fastener to maintain a desired tilt.

* * * * *